(12) United States Patent
Schneider

(10) Patent No.: US 9,258,113 B2
(45) Date of Patent: Feb. 9, 2016

(54) USERNAME BASED KEY EXCHANGE

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1211 days.

(21) Appl. No.: 12/201,321

(22) Filed: Aug. 29, 2008

(65) Prior Publication Data

US 2010/0058060 A1   Mar. 4, 2010

(51) Int. Cl.
*H04L 9/32* (2006.01)
*H04L 9/08* (2006.01)

(52) U.S. Cl.
CPC ............ *H04L 9/0844* (2013.01); *H04L 9/3271* (2013.01)

(58) Field of Classification Search
CPC ... H04L 9/3271; H04L 9/0863; H04L 9/3226; H04L 9/0844; H04L 2209/80; H04L 63/08; H04W 12/06
USPC .......................................................... 713/171
See application file for complete search history.

(56) References Cited

U.S. PATENT DOCUMENTS

| | | | |
|---|---|---|---|
| 5,491,752 A | 2/1996 | Kaufman et al. | |
| 5,774,552 A * | 6/1998 | Grimmer | 713/156 |
| 6,049,612 A | 4/2000 | Fielder et al. | |
| 6,073,234 A | 6/2000 | Kigo et al. | |
| 6,085,320 A | 7/2000 | Kaliski, Jr. | |
| 6,189,096 B1 | 2/2001 | Haverty | |
| 6,243,811 B1 * | 6/2001 | Patel | 713/167 |
| 6,249,867 B1 * | 6/2001 | Patel | H04L 9/0841 380/255 |
| 6,401,206 B1 | 6/2002 | Khan et al. | |
| 6,792,424 B1 | 9/2004 | Burns et al. | |
| 6,883,717 B1 | 4/2005 | Kelley et al. | |
| 7,031,468 B2 | 4/2006 | Hoffstein et al. | |
| 7,073,061 B2 * | 7/2006 | Asano et al. | 713/168 |
| 7,096,494 B1 * | 8/2006 | Chen | G06Q 20/04 380/259 |
| 7,194,765 B2 | 3/2007 | Blom | |
| 7,231,521 B2 * | 6/2007 | Buddhikot et al. | 713/171 |
| 7,242,766 B1 | 7/2007 | Lyle | |
| 7,363,651 B2 | 4/2008 | De Jong et al. | |

(Continued)

FOREIGN PATENT DOCUMENTS

WO   WO2005002131   1/2005

OTHER PUBLICATIONS

Biryukov, Alex et al., "Cryptanalysis of the Alleged SecurID Hash Function (extended version)" Lecture Notes in Computer Science, Springer-Verlag, 2003, 18 pages.

(Continued)

*Primary Examiner* — Tae Kim
(74) *Attorney, Agent, or Firm* — Lowenstein Sandler LLP

(57) ABSTRACT

A method and apparatus for an system and process for sharing a secret over an unsecured channel in conjunction with an authentication system. A client computes a message authentication code based on a hashed password value and a first random string received from the server. The client sends a response to the server that includes authentication data including a second random string. Both the client and server concatenate the first random string, second random string and username. Theses values are processed to generate as a shared master secret to further generate shared secrets or keys to establish a secured communication channel between the client and server. The secured communication can be based on stateless messaging where the decryption key associated with the message is identified by the message authentication code, which is placed within the message.

19 Claims, 6 Drawing Sheets

(56) References Cited

U.S. PATENT DOCUMENTS

| | | | |
|---|---|---|---|
| 7,673,142 B2 | 3/2010 | Jeffries et al. | |
| 7,945,776 B1 | 5/2011 | Atzmony et al. | |
| 8,156,333 B2 | 4/2012 | Schneider | |
| 8,225,093 B2 | 7/2012 | Fok et al. | |
| 8,352,738 B2 | 1/2013 | Parno et al. | |
| 8,660,268 B2 | 2/2014 | Schneider | |
| 2002/0056040 A1* | 5/2002 | Simms | 713/171 |
| 2002/0146005 A1 | 10/2002 | Gallant et al. | |
| 2003/0014646 A1* | 1/2003 | Buddhikot et al. | 713/184 |
| 2003/0093671 A1 | 5/2003 | Owlett | |
| 2003/0105964 A1 | 6/2003 | Brainard et al. | |
| 2003/0233546 A1 | 12/2003 | Blom | |
| 2003/0236803 A1 | 12/2003 | Williams | |
| 2004/0223619 A1 | 11/2004 | Jablon | |
| 2005/0081036 A1* | 4/2005 | Hsu | 713/171 |
| 2006/0021036 A1* | 1/2006 | Chang et al. | 726/22 |
| 2006/0041759 A1 | 2/2006 | Kaliski et al. | |
| 2006/0235700 A1 | 10/2006 | Wong et al. | |
| 2007/0005963 A1 | 1/2007 | Eldar et al. | |
| 2007/0101152 A1 | 5/2007 | Mercredi et al. | |
| 2007/0169181 A1 | 7/2007 | Roskind | |
| 2007/0226784 A1 | 9/2007 | Ueda et al. | |
| 2008/0034216 A1 | 2/2008 | Law | |
| 2008/0077979 A1 | 3/2008 | Jeffries et al. | |
| 2008/0155112 A1 | 6/2008 | Ma | |
| 2008/0301435 A1 | 12/2008 | Simon | |
| 2009/0193511 A1 | 7/2009 | Noe et al. | |
| 2009/0271462 A1 | 10/2009 | Schneider | |
| 2009/0287929 A1* | 11/2009 | Kolesnikov et al. | 713/171 |
| 2009/0288143 A1 | 11/2009 | Stebila et al. | |
| 2009/0300364 A1 | 12/2009 | Schneider | |
| 2010/0131756 A1 | 5/2010 | Schneider | |
| 2011/0131415 A1 | 6/2011 | Schneider | |

OTHER PUBLICATIONS

Office Action for U.S. Appl. No. 12/111,893 mailed Apr. 14, 2011.
Office Action for U.S. Appl. No. 12/111,893 mailed Oct. 11, 2011.
Office Action for U.S. Appl. No. 12/156,278, mailed Sep. 26, 2011.
Notice of Allowance for U.S. Appl. No. 12/156,278, mailed Nov. 23, 2011.
Office Action for U.S. Appl. No. 12/324,108, mailed Nov. 16, 2011.
Belare, Mihir, et al., "Keying Hash Functions for Message Authentication", ,http://cseweb.uscd.edu/~mihir/papers/kmd5.pdf . . . Published Jun. 1996.
Franks, J., et al., "RFC 2617 HTTP Authentication: Basic and Digest Access Authentication", IETF (Jun. 1999).
Oath Reference Architecture Release 2.0, Initiative for Open Authentication (2007).
Xiang, Fei et al. "A New Pseudo-Random Number Generator with Application in RSA", IEEE 2008.
Office Action for U.S. Appl. No. 12/111,893 mailed Oct. 31, 2012.
Office Action for U.S. Appl. No. 12/111,893 mailed Apr. 18, 2013.
Notice of Allowance for U.S. Appl. No. 12/111,893 mailed Oct. 3, 2013.
Office Action for U.S. Appl. No. 12/324,108, mailed Feb. 29, 2012.
USPTO; Office Action for U.S. Appl. No. 12/628,109, mailed Sep. 4, 2012.
USPTO; Office Action for U.S. Appl. No. 12/628,109, mailed Jan. 22, 2013.
USPTO; Office Action for U.S. Appl. No. 12/628,109, mailed May 9, 2013.
USPTO; Office Action for U.S. Appl. No. 12/628,109, mailed Nov. 18, 2013.
USPTO; Office Action for U.S. Appl. No. 12/628,109, mailed Apr. 9, 2014.
USPTO, Advisory Action for U.S. Appl. No. 12/111,893, mailed Dec. 16, 2011.
USPTO, Advisory Action for U.S. Appl. No. 12/324,108, mailed May 8, 2012.
USPTO, Notice of Allowance for U.S. Appl. No. 12/324,108, mailed Apr. 7, 2015.
USPTO; Office Action for U.S. Appl. No. 12/628,109, mailed Dec. 24, 2014.
USPTO, Notice of Allowance for U.S. Appl. No. 12/628,109, mailed Jul. 15, 2015.

* cited by examiner

USERNAME BASED KEY EXCHANGE

TECHNICAL FIELD

Embodiments of the present invention relate to secure communication system. Specifically, the embodiments of the invention relate to a method and system for securely sharing a master secret for secured communication between a server computer and client computer based on data exchanged as part of an authentication process.

BACKGROUND

One means of authentication includes the use of a password on computer systems. For example, on UNIX-type systems, the password for a user account is stored in a hashed form on the computer or at an authentication server. To make it harder for an attacker who has access to the hashed password to perform a brute force attack and potentially gain knowledge of several different systems at once, the stored password is augmented with a small random value specific to a system, also known as a "salt" before the password is hashed. The salt value and the hashed password are then stored in association with other account properties.

Since the salt value is randomly generated, only someone who already has access to the hashed password and salt value can compute what a hashed password value should be. This means that the unhashed password has to be passed to the authentication process in clear text form so that the authentication process can perform the hash and compare it to a stored hashed password. Thus, the password must only be sent over a secure connection or the password can be stolen by an eavesdropper.

Similarly, many secure communication protocols require that two communicating programs or computers have a shared secret or a shared master secret, which is either directly or indirectly utilized to encrypt data between the two communicating programs or computers. The secure communication protocols can only decrypt messages where the shared secret is known. The shared secret cannot be provided to each communicating program or computer in the clear or an eavesdropper would be able to intercept the shared secret and use it to decrypt the communications between the programs or computers.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for a system and process for exchanging a secret over an unsecured channel in conjunction with an authentication system and process. In one embodiment, a client requests an authentication challenge from a server. The server generates the authentication challenge and sends it to the client. The authentication challenge includes an authentication context identifier, a first random string, a timestamp, and a signature value. The client computes a salt value based on a username and the authentication context identifier from the authentication challenge. The signature value is computed based on the authentication context identifier, the first random string, and the timestamp. The client computes a hashed password value based on the computed salt value and a message authentication code based on the hashed password value and the first random string. The client also generates a second random string. The client sends a response to the server. The response includes the username, the message authentication code, the second random string, the timestamp, and the signature value. Both the client and server concatenate the first random string, second random string and username. The concatenated value is then used to generate a media authentication code using the hashed password as a key. The resulting value is then used as a shared master secret to generate shared secrets or keys to establish a secured communication channel between the client and server. The secured communication can be based on stateless messaging where the decryption key associated with the message is identified by the message authentication code, which is placed within the message.

Figure 1:
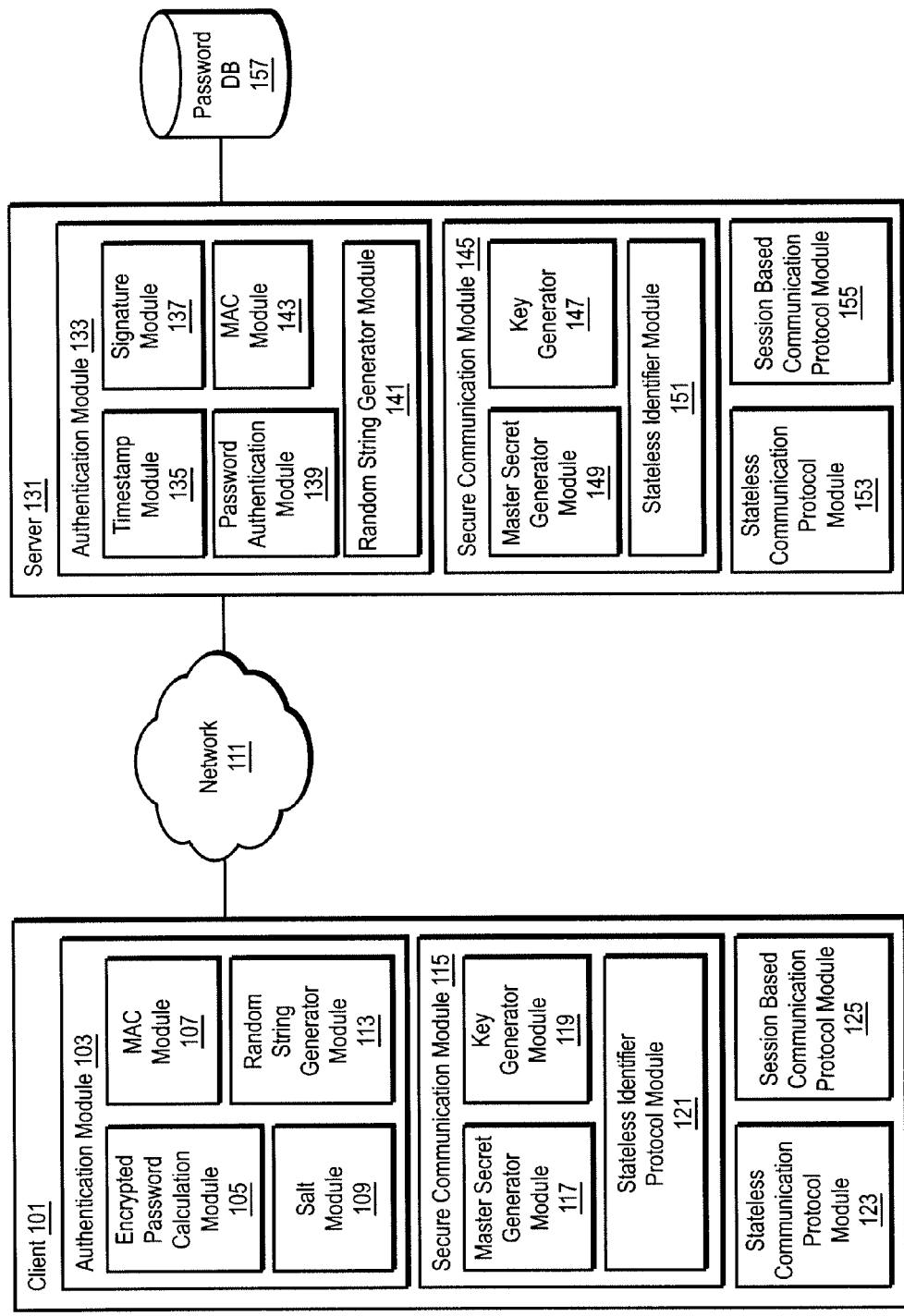
FIG. 1 is a block diagram illustrating one embodiment of a username based key exchange system.

FIG. 1 is a block diagram illustrating one embodiment of a username based key exchange system. The system includes a client 101 that is establishing communication and authenticating with a server 131. The client 101 can be any type of computer device including a desktop computer, laptop computer, handheld computer, console device or similar computing device. Similarly, the server 131 can be any type of computer device including a desktop computer, laptop computer, handheld computer, console device or similar computing device. The client computer 101 and server 131 can communicate over a network 111. The network 111 can be a wide area network (WAN), such as the Internet, a local area network (LAN) or similar network. The network 111 can include any number of computers and network devices. The network 111 can include any combination of wired and wireless communication lines and devices.

In one embodiment, the client 101 includes an authentication module 103, secure communication module 115, stateless communication protocol module 123, session based communication protocol module 125 and similar components. The client 101 can execute any number of applications or other programs that can interact with or utilize these components. For sake of clarity, these applications and programs are omitted from the illustration and discussion. One of ordinary skill in the art would understand that applications and programs would be inter-operable with the described aspects of the embodiments of the invention.

An authentication module 103 communicates with a server 131 to authenticate a user of the client 101 with the server 131 to obtain access to the resources managed by the server 131. The authentication module 103 can include an encrypted password calculation module 105, a message authentication code (MAC) module 107, a salt calculation module 109, a random string generation module 113 and similar modules.

An encrypted password calculation module 105 encrypts a password received from a user of the client 101. The encrypted password calculation module 105 generates the encrypted password as described herein below in regard to FIG. 3. The MAC module 107 generates a MAC based on a given input and designated key. The MAC module 107 is utilized to encrypt values such as the password, a concatenation of the random strings and username and similar values. The encrypted password or any other designated value can be utilized as a key for the MAC module 107. In another embodiment, other encryption algorithms or methods of enciphering values can be utilized in place of the MAC algorithm. The calculation of MAC values is discussed herein below in regard to FIGS. 2-4.

A salt calculation module 109 generates a salt value. A salt value can be calculated by concatenation of a username with a context identifier or similar values. A salt value can also be generated using other methods of combining these values including hashing, encrypting, enciphering or similar algorithms. The context identifier is a value generated by a server 131 or similar system to identify the system. Using the context identifier links the encryption of the password to the particular system and prevents a compromised password on one system from compromising other systems.

A random string generation module 113 creates a random string of any given length. The random strings generated by the module 113 contribute to the security of the authentication and secured channel by preventing the server from biasing the encryption of the encrypted password and MAC values that rely on the random string, such that the encryption of these values is weakened. The random strings generated by the client and server random string generator modules 113 and 141, together, prevent both the server and client from biasing the master key.

A secure communication module 115 interacts with the authentication module 103 utilizing the encrypted password and random strings from the authentication process to generate a shared master secret between the client 101 and the server 131. The shared master secret can then be used as a shared secret or key or used to create shared secrets and keys for encryption algorithms that can be used to secure a channel between the two. For example, communication protocols that can utilize the shared secret or derived keys or secrets include secure sockets layer (SSL), transport secure layer (TSL) and similar protocols. The secure communication module 115 can include a master secret generator module 117, a key generator module 119 and a stateless identifier module 121. The master secret generator module 117 generates a master secret based on the authentication data of the authentication module 103. One embodiment of a process for generating the master secret is described in regard to FIG. 2. The key generator 119 utilizes the master secret and can use any type of key or secret generation, encryption or enciphering algorithm to generate any type of keys or secrets needed for use with any secure communication protocol when encrypting the secured channel. The stateless identifier module 121 generates an identifier for keys or secrets associated with a stateless message with an encrypted payload such as a user datagram protocol (UDP) packet with an encrypted payload. The process of inserting the identifier is discussed in regard to FIG. 5.

The stateless communication protocol module 123 can be any implementation of a stateless communication protocol supported by the client system 101 such as UDP or similar protocols. The session based communication protocol module 125 can be any implementation of a session based or similar communication protocol supported by the client system 101, such as SSL or TSL.

The server 131 may include components analogous to those of the client 101 including an authentication module 133, a secure communication module 145, a stateless communication protocol module 153, a session based communication protocol module 155 and similar components. The server 131 can execute any number of applications or other programs that can interact with or utilize these components. For sake of clarity, these applications and programs are omitted from the illustration and discussion. One of ordinary skill in the art would understand that applications and programs would be inter operable with the described aspects of the embodiments of the invention.

An authentication module 133 communicates with a client 101 to authenticate a user of the client 101 with the server 131 to grant access to the resources managed by the server 131. The authentication module 133 can include a timestamp module 135, a message authentication code (MAC) module 143, a signature module 137, a random string generation module 141, a password authentication module 139 and similar modules.

A timestamp module 135 generates a timestamp based on the current system time or similar time source. The timestamp is used to ensure that authentication messages are not valid indefinitely to secure the system from attacks using old authentication message data. The signature module 137 generates a signature based on values associated with the authentication process. The signature is used to verify the response to the authentication challenge. The password authentication module 139 checks received passwords from the client 101 against a database of valid passwords 157.

The MAC module 143 generates a MAC based on a given input and designated key. The MAC module 143 is utilized to encrypt values such as the password, a concatenation of the random strings and username, and similar values. The encrypted password or any other designated value can be utilized as a key for the MAC module 143. In another embodiment, other encryption algorithms or methods of enciphering values can be utilized in place of the MAC algorithm. The calculation of MAC values is discussed herein below in regard to FIGS. 2-4.

A random string generation module 141 creates a random string of any given length. The random strings generated by the module 141 contribute to the security of the authentication and secured channel by preventing the client from biasing the encryption of the encrypted password and MAC values that rely on the random string, such that the encryption of these values is weakened. The random strings generated by the client and server random string generator modules 113 and 141, together prevent both the server and client from biasing the master key.

A secure communication module 145 interacts with the authentication module 133 utilizing the encrypted password and random strings from the authentication process to generate a shared master secret between the client 101 and the server 131. The shared master secret can then be used as a shared secret or key or used to create shared secrets and keys for encryption algorithms that can be used to secure a channel between the two. For example, communication protocols that can utilize the shared secret or derived keys or secrets include SSL, TSL and similar protocols. The secure communication module 145 can include a master secret generator module 149, a key generator module 147 and a stateless identifier module 151. The master secret generator module 149 generates a master secret based on the authentication data of the authentication module 133. One embodiment of a process for generating the master secret is described in regard to FIG. 4. The key generator 147 utilizes the master secret and can use any type of key generation, encryption or enciphering algorithm to generate any type of keys for use in encryption for the secured channel. The stateless identifier module 151 generates an identifier for keys associated with a stateless message with an encrypted payload such as a UDP packet with an encrypted payload. The process of matching the identifier to a key is discussed in regard to FIG. 6.

The stateless communication protocol module 153 can be any implementation of a stateless communication protocol supported by the server system 133 such as UDP or similar protocols. The session based communication protocol module 155 can be any implementation of a session based or similar communication protocol supported by the server system 155, such as SSL or TSL.

Figure 2:
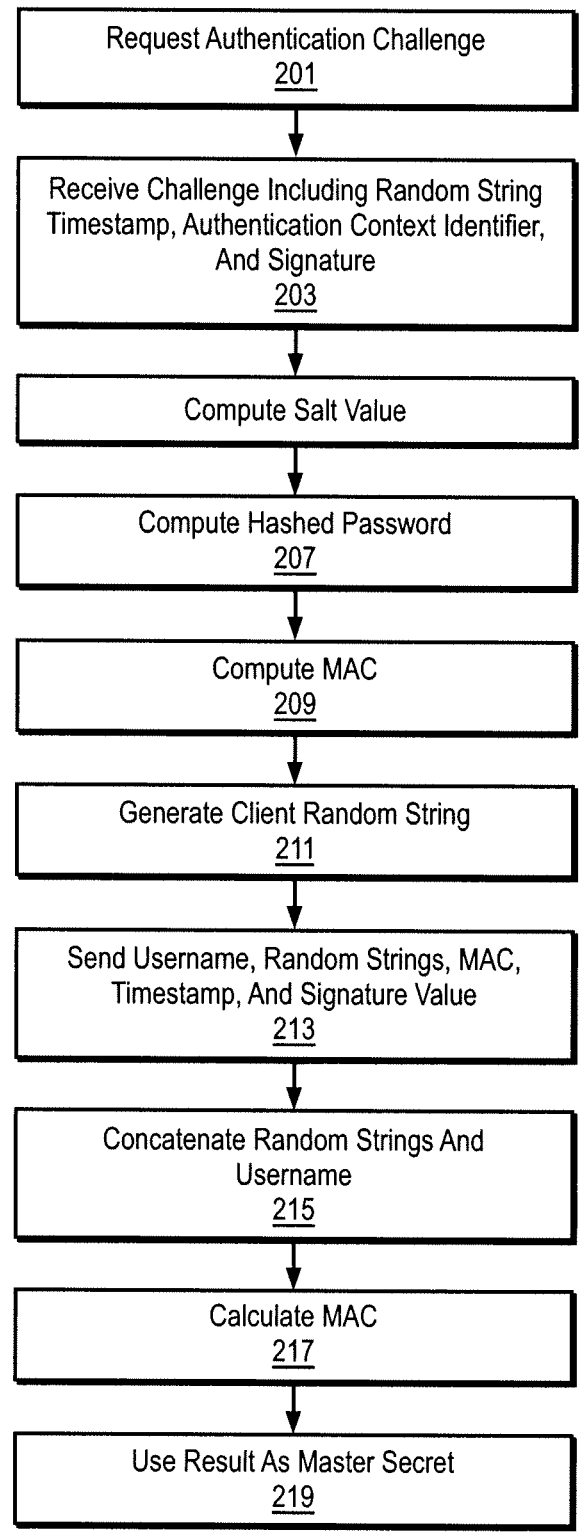
FIG. 2 is a flowchart of one embodiment of a process of a client computer for authentication and shared secret exchange over an unsecured channel.

FIG. 2 is a flowchart of one embodiment of a process of a client computer for authentication and shared secret exchange over an unsecured channel. In one embodiment, the process begins with a client request for an authentication challenge from a server (block 201). Any communication or messaging protocol or system can be used to issue the request. In response, the authentication challenge is received from the server (block 203). The request and challenge can be messages with any format or structure. The challenge includes a random string value, timestamp, signature value, authentication context identifier and similar data. The signature value is computed based on the authentication context identifier, the random string, and the timestamp. A salt value is computed based on a username associated with a user making the authentication request and the received authentication context identifier (block 205). The computation can be a concatenation, hashing, encryption or similar algorithm.

A hashed password value is then computed based on the computed salt value and the password received from the user (block 207). Any hashing, encryption, enciphering or similar algorithm can be used to generate a hashed or encrypted password value. A MAC can then be computed based on the hashed password value and the received random string (block 209). In another embodiment, the client calculates a MAC over the random challenge, where the random challenge also includes the timestamp. The client generates a random string to be included in the response for use in establishing a secure communication channel (block 211). The client returns a response to the server (block 213). In one embodiment, the response includes the username, the MAC, the received random string, the generated randoms string, the timestamp, and the signature value.

The client then concatenates or similarly combines the two random strings (block 215). In another embodiment, any values known to both the client and the server can be combined with or substituted for these values. A MAC of the concatenated value is then generated using the hashed password or similar value known to both the client and server as the key (block 217). The resulting MAC is then utilized as the shared master secret for establishing a secured channel using a secure transportation protocol (block 219).

Figure 3:
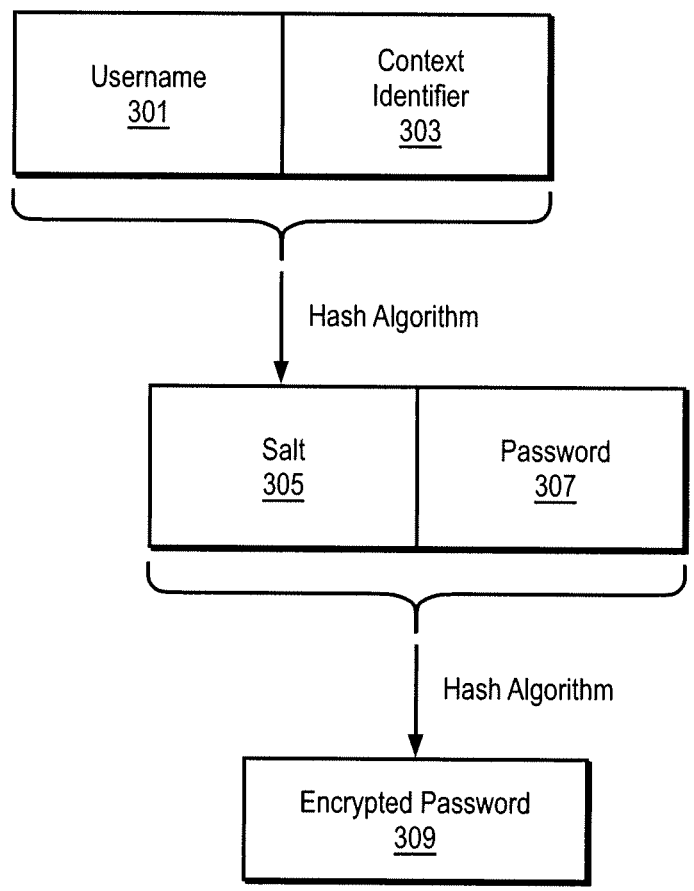
FIG. 3 is a block diagram illustrating one embodiment of a process for encrypting a password.

FIG. 3 is a block diagram illustrating one embodiment of a process for encrypting a password. Instead of using a random value for a salt, a username may be used as a basis for the salt value. In that way, the client is able to calculate the hashed password value. So that the same password can be used on multiple different systems, the username can be augmented with a system-specific authentication context identifier (e.g. a random string that each authentication system uses to distinguish itself). A salt value 305 can be calculated by concatenating a context identifier 303 and a username 301, and taking the cryptographic hash of the result. Alternately, the context identifier 303 can be used as the key in a MAC over the username 301. An encrypted password 309 can be hashed by concatenating the calculated salt value 305 and a password 307, then hashing the result, or by using the salt value 305 as the key in a MAC construction (or, alternately, using the password as the key, and the salt as the "message").

Figure 4:
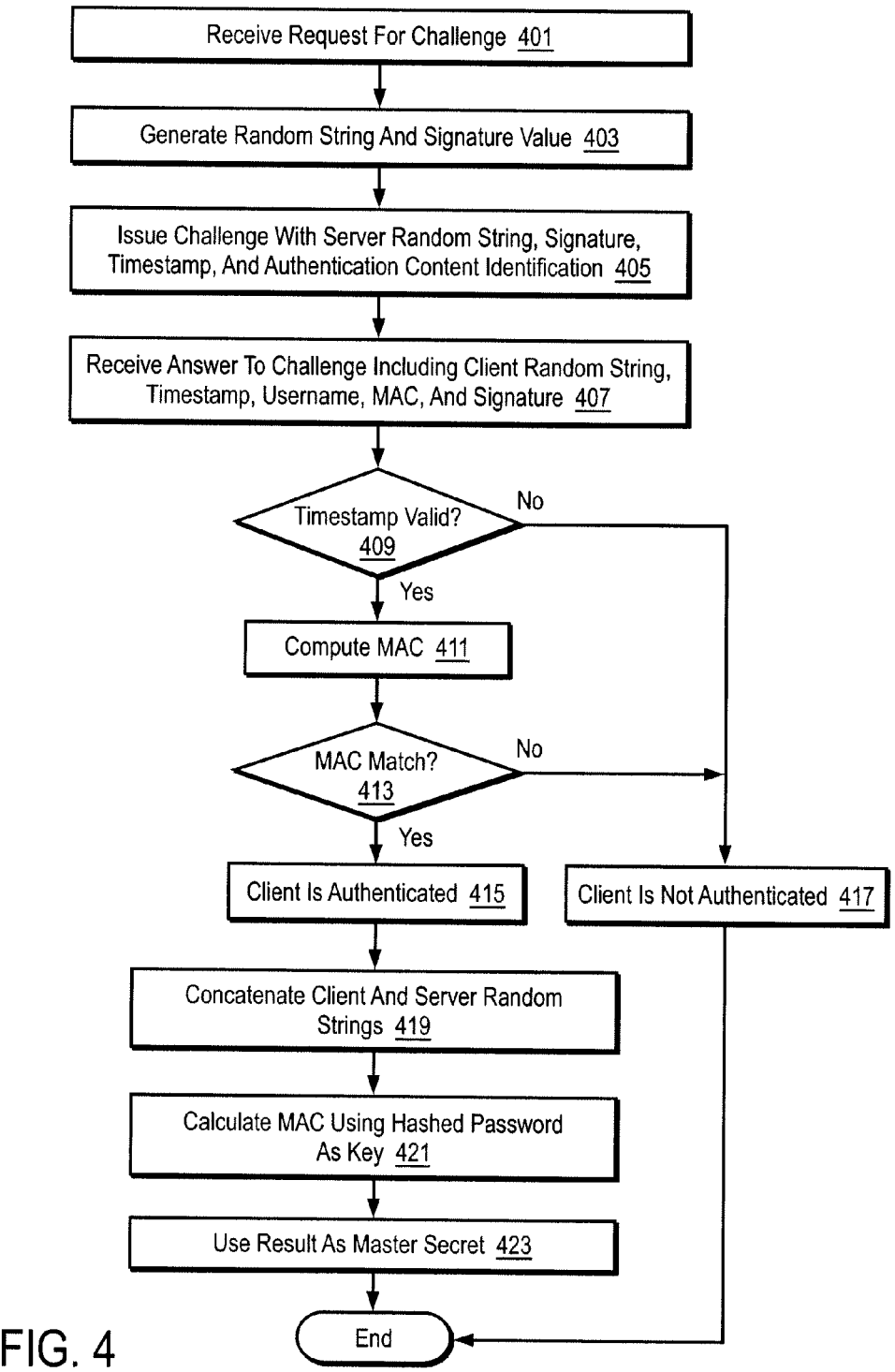
FIG. 4 is a flowchart of one embodiment of a process of a server for authentication and shared secret exchange over an unsecured channel.

FIG. 4 is a flowchart of one embodiment of a process of a server for authentication and shared secret exchange over an unsecured channel. The process can be initiated when a server receives a request for an authentication challenge from a client for a given username (block 401). The server generates a random string, an authentication context identifier, a timestamp, and a signature value (block 403). The authentication challenge includes the username, the authentication context identifier, the random string, the timestamp, and the signature value. The signature value is computed based on the authentication context identifier, the random string and the timestamp.

The server sends the authentication challenge to the client (block 405). The server receives a response to the authentication challenge from the client (block 407). The response includes data based on a salt value, the salt value being based on a username and an authentication context identifier. The response includes a client generated random string, the timestamp or a client generated timestamp, the username, client generated MAC and the signature.

The server verifies the validity of the timestamp and the signature value (block 409). The server retrieves a hashed password associated with the username provided in the response and computes a server MAC based on the random string and the retrieved hashed password (block 411). The server compares the server MAC with the client MAC to authenticate the client (block 413). If the timestamp is found to be not valid or if the server MAC and the client MAC do not match, the client is not authenticated (block 417).

If the MAC values do match and the timestamp is valid, i.e., the timestamp has not exceeded a given threshold, then the client random string and the server random string are concatenated (block 419). In another embodiment, any data known to both the client and the server can be combined with or used in combination with random string data. A MAC is calculated using the concatenated random string values as input and the received hashed or encrypted password as a key (block 421). Other values known to the client and server can also be used in place of the password. The resulting MAC value is used as a shared master secret for establishing a secured channel using a secure transportation protocol (block 423).

Figure 5:
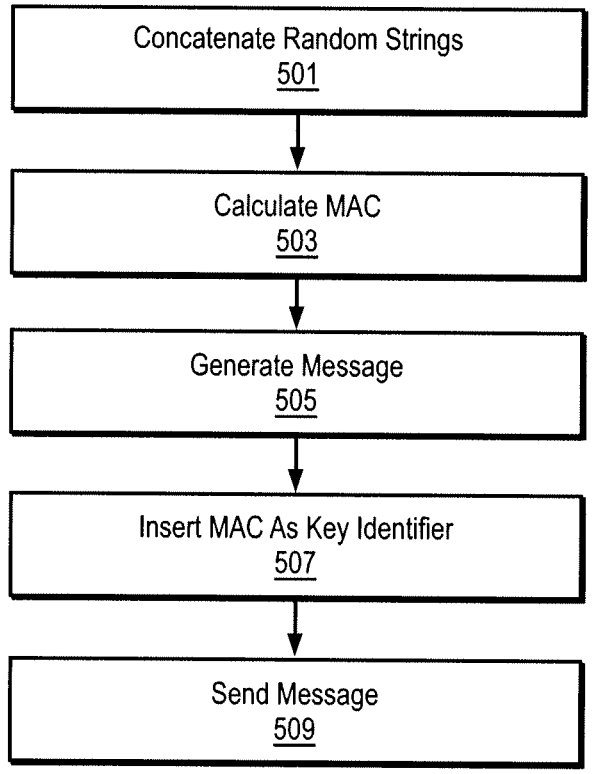
FIG. 5 is a flowchart of one embodiment of a stateless message generation process.

FIG. 5 is a flowchart of one embodiment of a stateless message generation process. The shared master secret can also be used for secure communication using stateless messaging. Generally, the shared master secrete is used to generate a set of shared secrets or keys for encrypting data in the stateless messages. The messages also include an identifier of the shared master secret, shared secret or key that is to be used to decrypt their payloads. In one example embodiment, the identifier is generated by first concatenating the random strings from the client and server or similarly combining these values or similar values known to both the client and the server (block 501). A MAC is then calculated over this concatenated or combined value using the username or similar value as a key (block 503). The message is then generated according to the stateless communication protocol (block 505) including the insertion of the calculated MAC that serves to identify the appropriate secret or key used to encrypt the payload (block 507). The generated message also includes a payload encrypted using the secret or key associated with the MAC or similar value. The message is then sent to the server or client. This process can be executed by either a client or a server sending the message.

Figure 6:
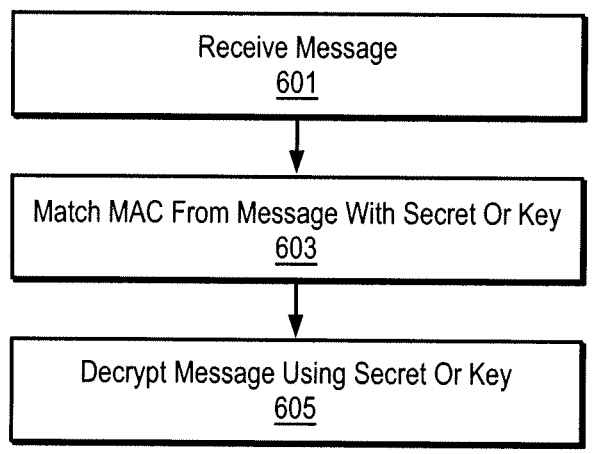
FIG. 6 is a flowchart of one embodiment of a stateless message decryption process.

FIG. 6 is a flowchart of one embodiment of a stateless message decryption process. The receiving client or server receives the message (block 601). The MAC of the message is then retrieved from the message. The retrieved MAC is matched with a shared secret or key by comparison with a stored set of established secrets or keys that are associated with MAC values that were derived from the combination of client and server random strings using the username as the key of the MAC. The message payload is then decrypted using the appropriate decryption algorithm and the identified secret or key.

Figure 7:
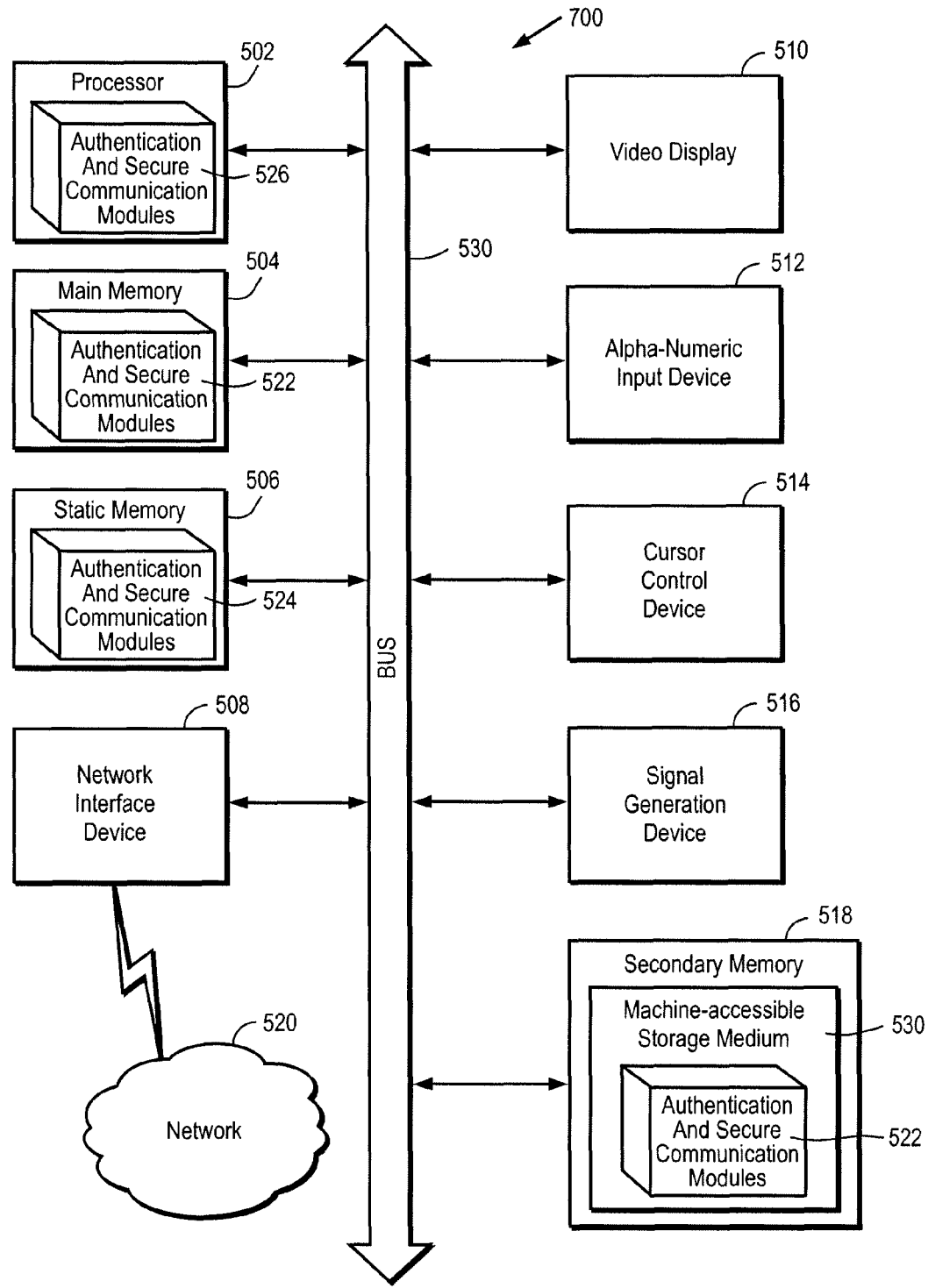
FIG. 7 is a diagram illustrating one embodiment of a username based key exchange system.

FIG. 7 is a diagram illustrating one embodiment of a username based key exchange system. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the secure communication module and the server computer executing a secure communication module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable medium), which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the desktop manager 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the authentication module and secure communication module 726) embodying any one or more of the methodologies or functions described herein. The authentication module and secure communication module 726 may also reside, completely or at least partially, within the main memory 704 and/or within the processing device 702 during execution thereof by the computer system 700, the main memory 704 and the processing device 702 also constituting machine-readable storage media. The authentication module and secure communication module 726 may further be transmitted or received over a network 718 via the network interface device 722.

The machine-readable storage medium 724 may also be used to store the authentication module and secure communication module 726 persistently. While the machine-readable storage medium 726 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "sending," "generating," "receiving," "authenticating," "concatenating," "calculating," "inserting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for username based key exchange has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    sending, by a processor over a network, a first random string in response to a request from a device;
    receiving, by the processor over the network, a second random string and a username from the device in response to the first random string;
    concatenating, by the processor, the first random string, the second random string and the username to form a first value;
    generating, by the processor, a first secret using the first value as input to a cryptographic function and a hashed password associated with the username as a cryptographic key; and
    establishing, by the processor, a communication session with the device over the network using a second secret derived from the first secret.

2. The method of claim 1, further comprising:
    generating the second secret from the first secret for use in a secure communication protocol for the communication session.

3. The method of claim 1, further comprising:
    calculating a first message authentication code in view of the second secret.

4. The method of claim 3, further comprising:
    inserting a second message authentication code into a message as a decryption key identifier.

5. A non-transitory computer-readable medium comprising instructions encoded thereon which, when executed by a processor, cause the processor to:
    send, by the processor over a network, a first random string in response to a request from a device;
    receive, by the processor over the network, a second random string and a username in response to the first random string;
    concatenate, by the processor, the first random string, the second random string and the username to form a first value;
    generate, by the processor, a first secret using the first value as input to a cryptographic function and a hashed password associated with the username as a cryptographic key; and
    establish, by the processor, a communication session with the device over the network using a second secret derived from the first secret.

6. The non-transitory computer-readable medium of claim 5, wherein the processor further to:
    generate the second secret from the first secret for use in a secure communication protocol for the communication session.

7. The non-transitory computer-readable medium of claim 6, wherein the processor further to:
    insert a second message authentication code into a message as a decryption key identifier.

8. A method comprising:
    receiving, by a processor over a network, a first random string from a device;
    sending, by the processor over the network, a second random string and a username in response to the first random string; and
    concatenating, by the processor, the first random string, the second random string and the username to form a first value;
    generating, by the processor, a first secret using the first value as input to a cryptographic function and a hashed password associated with the username as a cryptographic key; and
    establishing, by the processor, a communication session with the device over the network using a second secret derived from the first secret.

9. The method of claim 8, further comprising:
    generating the second secret from the first secret for use in a secure communication protocol for the communication session.

10. The method of claim 8, further comprising:
    calculating a first message authentication code in view of the second secret.

11. The method of claim 10, further comprising:
    inserting a second message authentication code into a message as a decryption key identifier.

12. A non-transitory computer-readable medium comprising instructions encoded thereon which, when executed by a processor, cause the processor to:
    receive, by the processor over a network, a first random string from a device;
    send, by the processor over the network, a second random string and a username in response to the first random string;

concatenate, by the processor, the first random string, the second random string and the username to form a first value;

generate, by the processor, a first secret using the first value as input to a cryptographic function and a hashed password associated with the username as a cryptographic key; and establish, by the processor, a communication session with the device over the network using a second secret derived from the first secret.

13. The non-transitory computer-readable medium of claim 12, wherein the processor further to:

generate the second secret from the first secret for use in a secure communication protocol for the communication session.

14. The non-transitory computer-readable medium of claim 13, wherein the processor further to:

calculate a first message authentication code in view of the second secret.

15. The non-transitory computer-readable medium of claim 14, wherein the processor further to:

insert a second message authentication code into a message as a decryption key identifier.

16. A system comprising:

a memory;

a network interface device; and a processor operatively coupled to the memory, the processor to:

send, over a network using the network interface device, a first random string in response to a request from a device;

receive, over the network using the network interface device, a second random string and a username in response to the first random string;

concatenate the first random string, the second random string and the username to form a first value;

generate a first secret using the first value as input to a cryptographic function and a hashed password associated with the username as a cryptographic key; and establish a communication session with the device over the network using a second secret derived from the first secret.

17. The system of claim 16, wherein the processor is further to:

generate the second secret from the first secret for use in a secure communication protocol for the communication session.

18. The method of claim 1, wherein the network is at least one of a wide area network (WAN) or a local area network (LAN).

19. The method of claim 1, wherein sending the first random string in response to a request comprises sending the first random string by a server device over the network in response to the request from a client device.

* * * * *